(12) United States Patent
Cermak et al.

(10) Patent No.: US 8,506,367 B2
(45) Date of Patent: Aug. 13, 2013

(54) MOBILE AIR CLEANING UNIT AND DISTRIBUTION SYSTEM

(75) Inventors: Radim Cermak, Prague (CZ); Antonin Ryska, Prague (CZ); Michal Kolda, Prague (CZ); Marketa Kopecka, Vsetin (CZ); Michal Hegar, Prague (CZ)

(73) Assignee: Thermo King Corporation, Minneapolis, MN (US)

( * ) Notice: Subject to any disclaimer, the term of this patent is extended or adjusted under 35 U.S.C. 154(b) by 1048 days.

(21) Appl. No.: 12/512,455

(22) Filed: Jul. 30, 2009

(65) Prior Publication Data

US 2011/0028078 A1 Feb. 3, 2011

(51) Int. Cl.
*B60H 1/34* (2006.01)
*B60H 3/00* (2006.01)

(52) U.S. Cl.
USPC ............................................. 454/152; 62/419

(58) Field of Classification Search
USPC ................. 454/187, 255, 256, 258, 238, 242, 454/149, 83, 152, 136, 88, 75, 76; 62/419
See application file for complete search history.

(56) References Cited

U.S. PATENT DOCUMENTS

| | | |
|---|---|---|
| 2,605,690 A | 8/1952 | Henney |
| 3,102,654 A | 9/1963 | Millman et al. |
| 3,291,027 A | 12/1966 | Beckwith |
| 3,397,631 A | 8/1968 | Simons |
| 3,862,549 A | 1/1975 | Fernandes |
| 5,263,897 A | 11/1993 | Kondo et al. |
| 5,358,444 A | 10/1994 | Helm et al. |
| 6,358,139 B1 | 3/2002 | Renz |
| 6,632,133 B2 | 10/2003 | Barber et al. |
| 6,796,132 B1 | 9/2004 | Hille et al. |
| 6,835,128 B1 | 12/2004 | Olson |
| 2001/0002363 A1 | 5/2001 | Laborde et al. |
| 2004/0029521 A1* | 2/2004 | Cauthorne .................... 454/229 |
| 2007/0032186 A1 | 2/2007 | Clark et al. |

FOREIGN PATENT DOCUMENTS

DE 9004809 U1 7/1990

OTHER PUBLICATIONS

Thermo King EnviroFresh Air Quality Systems for Public Transport, dated May 2005.

* cited by examiner

*Primary Examiner* — Steven B McAllister
*Assistant Examiner* — Helena Kosanovic
(74) *Attorney, Agent, or Firm* — Michael Best & Friedrich LLP (57) ABSTRACT

A mass transit vehicle including a cabin mounted to a frame and including a roof and a passenger zone defining a passenger zone length, an air cleaning unit including an air cleaner housing mounted to the roof, an air cleaning device disposed within the housing, an inlet upstream of the air cleaning device, and an outlet downstream of the air cleaning device, and a duct system disposed within the cabin and extending substantially along the passenger zone length. The air cleaning unit is operable to draw in air through the inlet, through the air cleaning device, and discharge a flow of cleaned air out of the outlet, and the duct system is in fluid communication with the outlet and operable to receive the flow of cleaned air from the outlet and direct the flow of cleaned air to the cabin substantially evenly along the passenger zone length.

11 Claims, 6 Drawing Sheets

MOBILE AIR CLEANING UNIT AND DISTRIBUTION SYSTEM

BACKGROUND

The present invention relates to air cleaning units and distribution systems within passenger vehicles.

Protection of human health and environmental quality during transport in passenger vehicles are particularly important design considerations for air management and distribution for mass transit vehicles. To address these considerations, most current HVAC units for bus and rail applications include particulate air filters. However, such filters are usually of low efficiency as the units are necessarily small due to spatial constraints within the HVAC units.

SUMMARY

Typical HVAC units have a compact design that does not allow for drop-in implementation of new filtering technologies such as advanced cleaning technologies. It is predicted with a high level of confidence that the efficiency of air cleaning technologies, if placed in space available today, will not ensure sufficient (optimum, high efficiency, high quality) air cleaning. At the same time, it is not desirable to modify the layout of units (for example, make the units wider) due to cost, customer reluctance, and other reasons.

The present invention, in some constructions, addresses the concerns of the prior art by providing uniform air distribution in terms of air volume, temperature, humidity, quality, cleanliness, and other parameters. The invention can also, for example, utilize various air cleaning technologies at their desired performance efficiencies without the need to modify the size and shape of HVAC units for buses or rail vehicles. Such technologies (e.g., air purification, sanitation, disinfection, etc.) can include air filtration for both particulate and gaseous matter (e.g., activated carbon, etc.), air ionization, electrostatic precipitators, UV irradiation, photocatalytic oxidation, various ozone- and hydroxyl radicals-based methods, silver coating, and others.

In one embodiment, the invention provides a mass transit vehicle that includes a frame, a cabin, an air cleaning unit, and a duct system. The cabin is mounted to the frame and includes a roof and a passenger zone defining a passenger zone length. The air cleaning unit includes an air cleaner housing mounted to the roof, an air cleaning device disposed within the housing, an inlet upstream of the air cleaning device, and an outlet downstream of the air cleaning device. The air cleaning unit is operable to draw in air through the inlet, through the air cleaning device, and discharge a flow of cleaned air out of the outlet. The duct system is disposed within the cabin and extends substantially along the passenger zone length, and is in fluid communication with the outlet and operable to receive the flow of cleaned air from the outlet and direct the flow of cleaned air to the cabin substantially evenly along the passenger zone length.

In another embodiment the invention provides a mass transit vehicle that includes a frame. A cabin is mounted to the frame and includes a roof, a passenger zone that defines a passenger zone length, and an aisle and a window on opposite sides of a portion of the passenger zone. An air cleaning unit includes an air cleaner housing that is mounted to the roof, an air cleaning device that includes an advanced air cleaning media and is disposed within the housing, an inlet upstream of the air cleaning device, and an outlet downstream of the air cleaning device. The air cleaning unit is operable to draw in air through the inlet, through the air cleaning device, and discharge a flow of cleaned air out of the outlet. An air conditioning unit operates independently from the air cleaning unit and includes an air conditioner housing separate from the air cleaner housing and mounted to the roof, an air conditioning device disposed within the air conditioning housing, an inlet upstream of the air conditioning device, and an outlet downstream of the air conditioning device. The air conditioning unit is operable to draw in air through the inlet, through the air conditioning device, and discharge a flow of conditioned air out of the outlet. A duct system is disposed within the cabin and includes a cleaned air duct in fluid communication with the outlet of the air cleaning unit and a conditioned air duct in communication with the outlet of the air conditioning unit. The cleaned air duct extends substantially along the passenger zone length and the conditioned air duct extends substantially along the passenger zone length. The cleaned air duct directs the flow of cleaned air to the passenger zone substantially evenly along the passenger zone length and the conditioned air duct directs the flow of conditioned air toward the aisle and the window.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
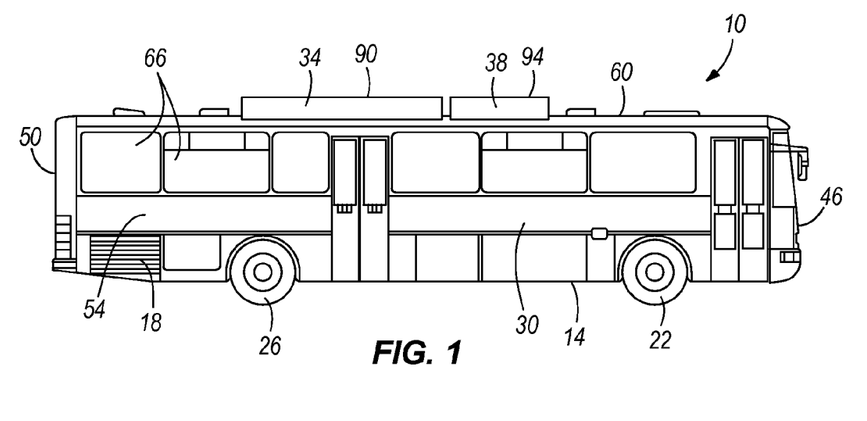
FIG. 1 is a side view of a bus.

FIG. 1 illustrates a mass transit passenger vehicle in the form of a bus 10. The bus 10 includes a frame 14, an engine (not shown) supported by the frame 14 in an engine compartment 18, front wheels 22 and rear wheels 26 that support the bus 10 for movement over the ground, a cabin 30 mounted to the frame 14, an air conditioning unit 34, an air cleaning unit 38, and a duct system 42 (see FIGS. 2 and 4). The cabin 30 has a front 46, a back 50, a right side 54 (visible in FIG. 1), and a left side 58 (see FIG. 2), and a roof 60. The left and right sides 54, 58 include windows 66. In other embodiments, the vehicle may be another passenger vehicle such as a train passenger car.

Figure 2:
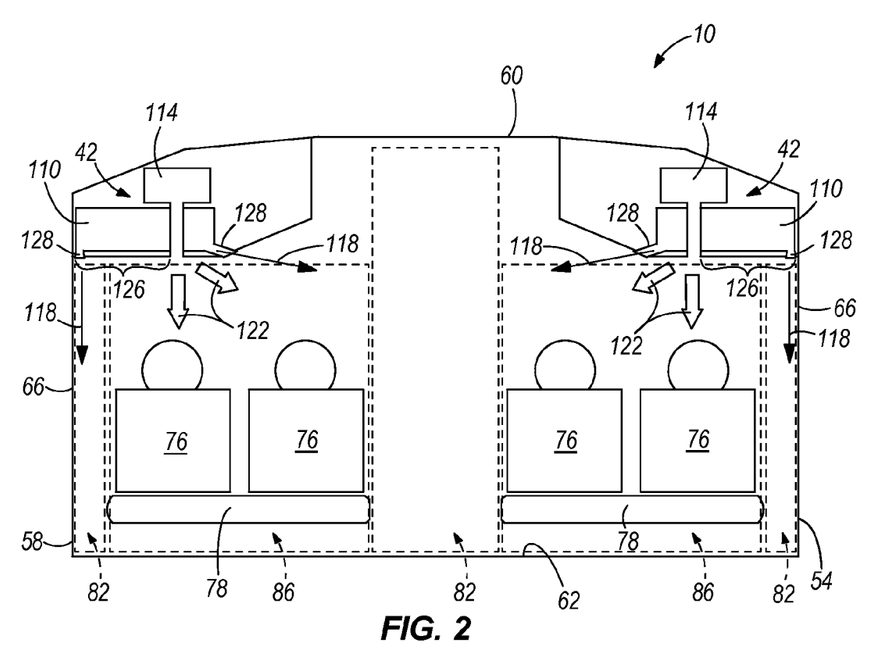
FIG. 2 is a schematic view of the inside of the bus of FIG. 1.
Figure 3:
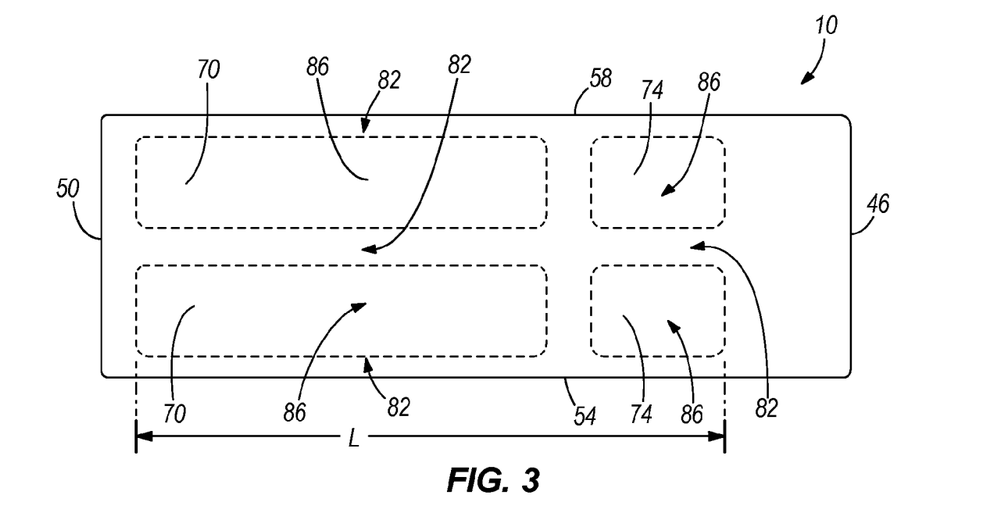
FIG. 3 is a schematic top view of the inside of the bus of FIG. 1.

With reference to FIGS. 1-3, the illustrated cabin 30 defines a typical bus interior with an aisle 62, a seating area 70 (see FIG. 3), and a disabled/standing area 74 (see FIG. 3) near the front 46 of the cabin 30. The aisle 62 extends from the front 46 of the cabin 30 to the back 50 of the cabin 30 so passengers 76 may walk between the front 46 and back 50 of the cabin 30. The windows 66 are positioned on the sides of the bus 10 so passengers 76 may look outside the bus 10 from the seating area 70 and the disabled/standing area 74.

As best shown in FIG. 2, the illustrated seating area 70 is arranged with two rows of benches 78. Each bench 78 holds two passengers 76. The two rows are positioned adjacent the sides 54, 58 of the cabin 30 next to the windows 66 such that the aisle 62 is positioned between the two rows. Other embodiments are contemplated wherein the bus 10 may have a different arrangement, as desired. For example, the benches 78 may be individual seats or there may not be a standing area 74. In other embodiments, the benches 78 may be aligned in banks running from the front 46 to the back 50 of the cabin 30. The particular arrangements of the benches 78 is not limiting to the invention and may be arranged as desired.

With reference to FIG. 3, the aisle 62 and windows 66 in combination define a first zone 82 that extends the full length of the cabin 30. In the illustrated embodiment, the first zone 82 is located between the two seating areas 70 and outboard of the two seating areas 70.

The seating area 70 and the disabled/standing area 74 defines a passenger zone 86 and a passenger zone length L where passengers 76 will be located during transit of the bus 10. The passengers 76 will be located in the passenger zone 86 for the majority of the time spent on the bus 10. Therefore, the majority of the air consumed will be consumed by passengers 76 within the passenger zone 86. In other embodiments, the bus 10 may be different and the first zone 82 and the passenger zone 86 may be arranged differently, as desired. In the illustrated embodiment, the first zone 82 flanks each passenger zone 86.

Figure 4:
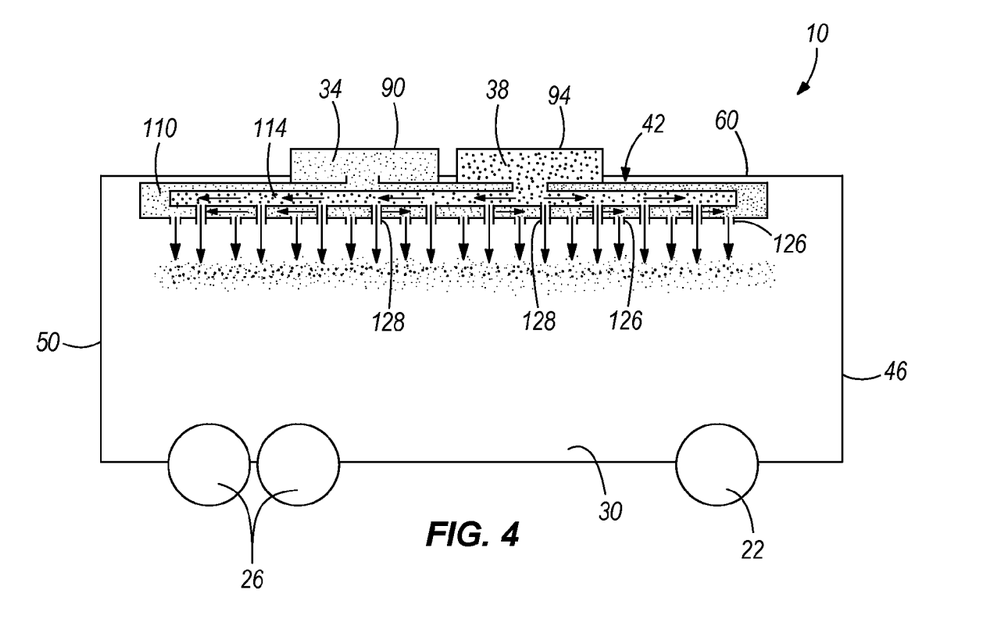
FIG. 4 is a schematic side view of the bus of FIG. 1.
Figure 5:
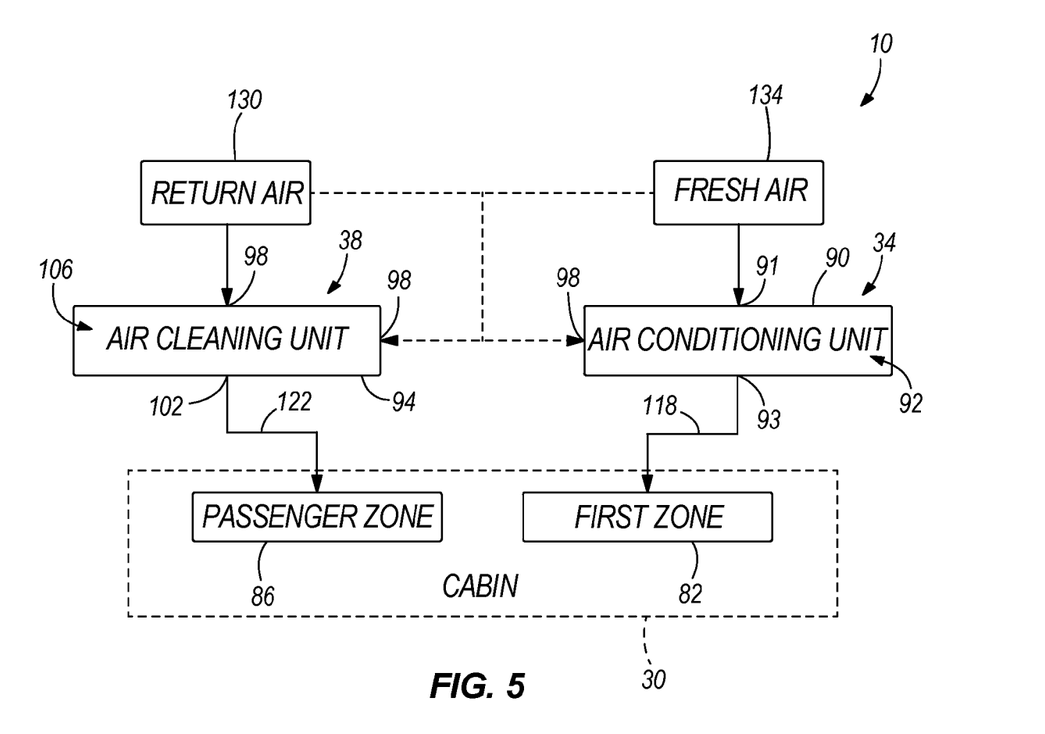
FIG. 5 is a schematic view of an air conditioning unit and an air cleaning unit of the bus of FIG. 1.

Referring to FIGS. 4 and 5, the air conditioning unit 34 has an independent air conditioning housing 90 and in the illustrated embodiment is mounted on the roof 60 of the bus 10. With reference to FIG. 5, the air conditioning unit 34 includes an inlet 91, a conditioning zone 92 that may include a compressor, a condenser, an expansion valve, an evaporator, and an air mixing chamber (none shown), and an outlet 93 all housed within the air conditioning housing 90. Additionally, the air conditioning unit 34 may include other components, such as dryers, economizers, controllers, prime movers, and other components, as desired.

The air cleaning unit 38 has an independent air cleaning housing 94 that is separate from the air conditioning housing 90 and in the illustrated embodiment is mounted on the roof 60. The air cleaning unit 38 is independent from the air conditioning unit 34 in form and function. The air cleaning housing 94 is separate from the air conditioning housing 90 and the air cleaning unit 38 may operate independently with separate controls or even without an air conditioning unit 34 employed on the bus 10. For example, in temperate climates the air conditioning unit 34 may be removed and the air cleaning unit 38 allowed to operate individually to maintain the desired environment within the cabin 30.

The air cleaning unit 38 includes an inlet 98, an outlet 102, and air cleaning media 106. Supply air flows into the inlet 98, through the air cleaning media 106, and out the outlet 102. The air cleaning media 106 includes one or more air cleaning technologies and is housed within the air cleaning housing 94.

In the embodiment shown in FIGS. 2, 4, and 5, the duct system 42 includes a conditioned air duct 110 and a cleaned air duct 114. The conditioned air duct 110 is separate from the cleaned air duct 114 such that a conditioned air flow path 118 is separate from a cleaned air flow path 122.

With specific reference to FIG. 2, the cleaned air duct 114 directs air from the air cleaning unit 38 to the passenger zone 86 such that passengers 76 consume cleaned air. The illustrated cleaned air duct 114 includes clean air vents 126 that direct the cleaned air flow path 122 toward the passengers 76. In one embodiment, the passengers 76 may manipulate the clean air vents 126 such that the cleaned air flow path 122 is directed as desired. In other embodiments, the direction of the cleaned air flow path 122 may be predetermined.

With continued reference to FIG. 2, the conditioned air duct 110 directs air from the air conditioning unit 34 to the first zone 82 such that a desirable temperature is maintained within the cabin 30. In the embodiment illustrated in FIGS. 2, 4 and 5, conditioned air vents 128 direct the conditioned air away from the passenger zone 86. As such, the air within the passenger zone 86 is composed of a relatively large portion of cleaned air. The conditioned air flow path 118 is directed into the first zone 82 and allowed to diffuse into the remaining zones of the cabin 30. In this way, the temperature of the cabin 30 is maintained while providing passengers 76 with a large portion of cleaned air.

FIG. 4 shows the cleaned air duct 114 extending substantially from the front 46 to the back 50 of the cabin 30, such that the cleaned air flow path 122 is delivered to the passenger zone 86. Likewise, the conditioned air duct 110 extends substantially from the front 46 to the back 50 of the cabin 30, such that the temperature of the bus 10 is maintained substantially constant from the front 46 to the back 50 of the cabin 30.

With reference to FIG. 5, the air conditioning unit 34 and the air cleaning unit 38 have two sources of supply air. Return air 130 is air collected from the interior of the cabin 30 and is rerouted into the air conditioning unit 34 or the air cleaning unit 38 to be reconditioned or cleaned, respectively. Fresh air 134 is collected from the exterior of the bus 10 and conditioned or cleaned before being delivered to the passengers 76. In the illustrated embodiment, both the air conditioning unit 34 and the air cleaning unit 38 receive a mixture of fresh air 134 and return air 130. Both the air conditioning unit 34 and the air cleaning unit 38 include a selector device (not shown) that collects the desired ratio of return air 130 and fresh air 134 to be conditioned and cleaned. In other embodiments, the air cleaning unit 38 receives all return air 130, a mix of return air 130 and fresh air 134, or all fresh air 134, and the air conditioning unit 34 receives all return air 130, a mix of return air 130 and fresh air 134, or all fresh air 134. Additionally, a portion of the cleaned air may pass to the air conditioning unit 34 or the conditioned air may pass to the air cleaning unit 38.

From the air cleaning unit 38, the cleaned air flow path 122 is delivered via the cleaned air duct 114 to the passenger zone 86. The conditioned air flow path 118 is delivered by the conditioned air duct 110 from the air conditioning unit 34 to the first zone 82. In the illustrated embodiment, the cleaned air flow path 122 and the conditioned airflow path 118 are mixed within the cabin 30 after exiting the duct system 42. In other embodiments, the cleaned air flow path 122 and the conditioned air flow path 118 may mix in the duct system 42 after exiting the cleaned air duct 114 and/or the conditioned air duct 110, respectively, before being discharged substantially uniformly to the first zone 82 and/or the passenger zone 86. For example, the cleaned air duct 114 could be contained within the conditioned air duct such that the cleaned air flow path 122 exits the cleaned air duct 114 into the conditioned air duct prior to being discharged substantially uniformly into the first zone 82 and/or the passenger zone 86.

Figure 6:
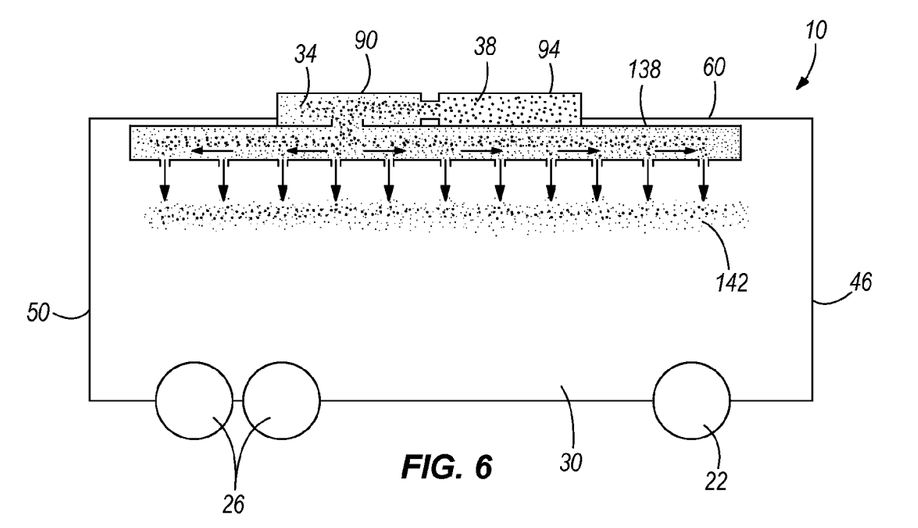
FIG. 6 is a schematic side view of a bus according to another embodiment of the invention.
Figure 7:
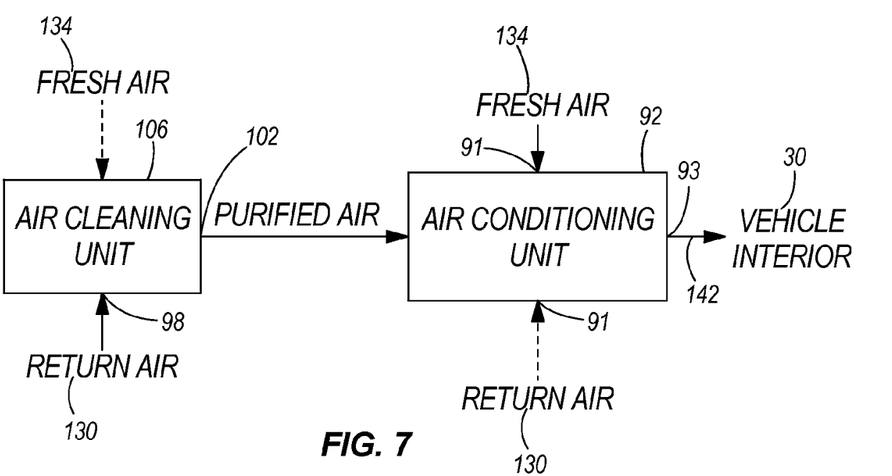
FIG. 7 is a schematic view of an air conditioning unit and an air cleaning unit of the bus of FIG. 6.

Another embodiment of the invention will be described with respect to FIGS. 6 and 7. In this embodiment, a common duct 138 receives the cleaned air and the conditioned air and distributes a mixed air flow 142 along the length of the cabin 30. With reference to FIG. 7, multiple alternative arrangements may be used when operating the air cleaning unit 38 and the air conditioning unit 34. In one embodiment, shown in solid lines, the air cleaning unit 38 receives return air 130 and cleans it with any of the methods mentioned above. The cleaned air is then directed to the air conditioning unit 34. The air conditioning unit 34 receives the cleaned air from the air cleaning unit 38 and the fresh air 134. The air conditioning unit 34 then mixes and conditions the air and passes the cleaned and conditioned air to the cabin 30 via the common duct 138.

In another embodiment, shown in broken lines, the air cleaning unit receives fresh air 134 and cleans it with any of the methods mentioned above. The cleaned air is then directed to the air conditioning unit 34. The air conditioning unit 34 receives the cleaned air from the air cleaning unit 38 and the return air 130. The air conditioning unit 34 then mixes and conditions the air and passes the cleaned and conditioned air to the cabin 30 via the common duct 138.

In yet another embodiment, the air conditioning unit 34 and the air cleaning unit 38 receive both fresh air 134 and return air 130 (i.e., the units 34, 38 receive the air shown in both the solid and broken lines in FIG. 7). Other arrangements may exist and may be implemented as desired. The different arrangements each offer different advantages and may be more or less desirable depending on the operating environment. For example, the embodiment shown in solid lines may be preferred in suburban or rural areas, where indoor pollution sources contribute most to the interior pollution (fresh air 134 is already substantially clean and it does not have to be purified). The embodiment, shown in broken lines may be preferred in polluted urban, industrial, or for example dusty desert areas, where outdoor air is substantially more polluted than the return air 130. One reason for selectively treating one or the other air-stream (i.e., cleaned air 134 and return air 130) is to more efficiently design and size of the air conditioning unit 34 and the air cleaning unit 38 (e.g., the smaller amount of air that is treated, the smaller the units 34, 38 may be or the same sized units 34, 38 may run at a higher efficiency).

Figure 8:
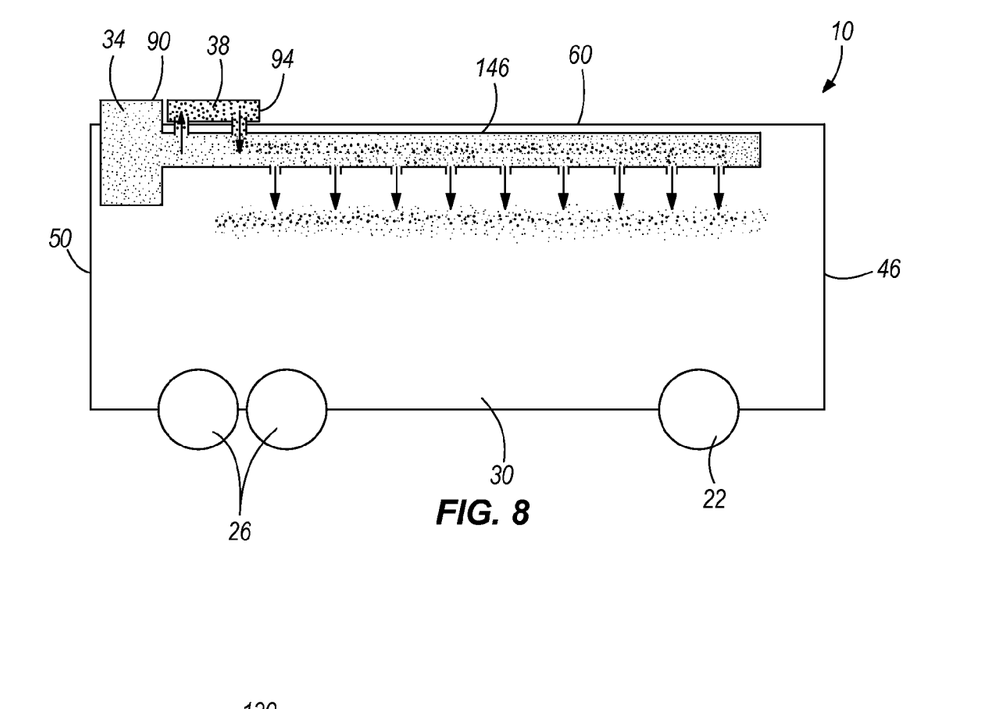
FIG. 8 is a schematic side view of a bus according to another embodiment of the invention.
Figure 9:
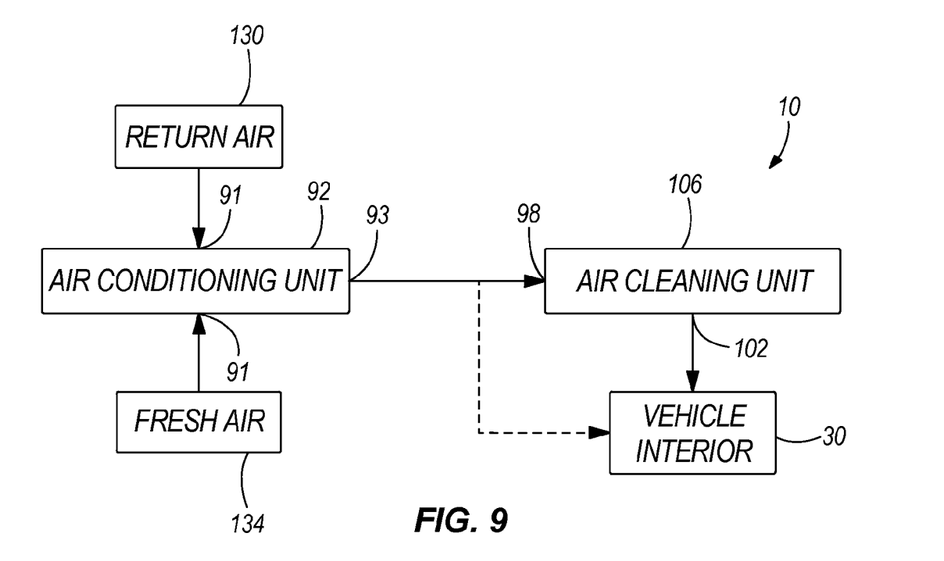
FIG. 9 is a schematic view of an air conditioning unit and an air cleaning unit of the bus of FIG. 8.

Another embodiment of the invention will be described with respect to FIGS. 8 and 9. In this embodiment, the air conditioning unit 34 receives return air 130 and fresh air 134, conditions the air, and supplies the conditioned air to a common duct 146. In this embodiment, the air cleaning unit 38 draws conditioned air out of the common duct 146 and cleans the conditioned air. The conditioned and cleaned air is then returned to the common duct 146 and distributed throughout the length of the cabin 30. A portion of the conditioned air is not drawn into the air cleaning unit 38 but instead is delivered directly into the cabin 30 via the common duct 146. In an alternate embodiment, the air cleaning unit 38 is not bypassed, but cleans substantially all the air provided to the cabin 30.

In the illustrated embodiment, the air cleaning unit 38 and the air conditioning unit 34 are located adjacent to one another and both are positioned substantially near the rear 50 of the bus 10 and the end portion of the duct system 42. This arrangement provides for even distribution and sufficient mixing of the cleaned air flow path 122 and the conditioned air flow path 118. In other embodiments, the air cleaning unit 38 and the air conditioning unit 34 may be positioned differently (e.g., at the front 46 of the bus 10) such that the cleaned air flow path 122 and the conditioned air flow path 118 are evenly distributed and sufficiently mixed.

Figure 10:
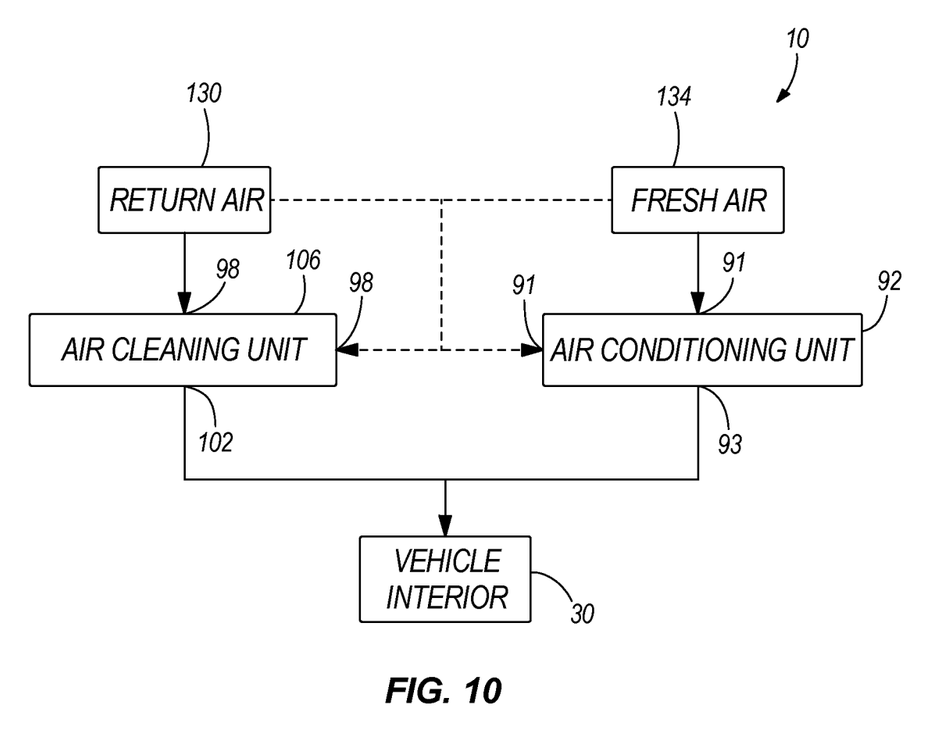
FIG. 10 is a schematic view of an air conditioning unit and an air cleaning unit of the bus of FIG. 8.

In another embodiment, illustrated in FIG. 10, the air cleaning unit 38 may receive fresh air 134, return air 130, and or conditioned air before cleaning the air and returning the air to the common duct 146. The air cleaning unit 38 and the air conditioning unit 34 operate independently but the conditioned air flow and the cleaned air flow may mix before entering the cabin 30. This arrangement is similar to that described with respect to FIGS. 1-5 but without the separate conditioned air duct 110 and cleaned air duct 1 14. This may be advantageous due to space limitations, cost, or other reasons. In yet another arrangement, all the conditioned air may pass through the air cleaning unit 38 before entering the cabin 30.

In one embodiment, the air cleaning media 106 is an advanced air cleaning media. For purposes of this invention, advanced air cleaning media includes air ionization, electrostatic precipitators, UV irradiation, photocatalytic oxidation, various ozone- and hydroxyl radical-based methods, silver coating, as well as any other media that requires a technology beyond a simple particulate filter. Additionally, the air cleaned by the air cleaning unit 38 may include beneficial additives such as charged ions or other additives that have the ability to further clean downstream air and components (e.g., the duct system 42 and/or the air conditioning unit 34).

To this point, existing air cleaning technologies have not provided advanced cleaning media and techniques for passenger vehicles. Such cleaning media will improve the quality of air consumed by passengers 76 on such vehicles. In addition, the invention provides a delivery system that delivers the cleaned air to the passengers 76 throughout the cabin 30. The invention provides a better air cleaning and delivery system that may be utilized with or without the air conditioning unit 34.

The air cleaning unit 38 is separate and independent from the air conditioning unit 34 for several reasons. For example, a separate air cleaning unit 38 may be used for a bus 10 in a temperate climate that does not require air conditioning to maintain an acceptable temperature within the cabin 30. Additionally, the air cleaning unit 38 may be added to existing vehicles that already have an air conditioning unit 34 but no air cleaning system. The air cleaning unit 38 and the air conditioning unit 34 cooperate to maintain a satisfactory atmosphere within the cabin 30. This may be especially useful in urban environments where population concentration is large and concerns about air pollution are present. The invention may be added to existing vehicles to improve the air quality consumed by passengers 76 riding within the passenger zone 86.

The invention provides, among other things, an independently operating air cleaning unit 38 with an independent air cleaning housing 94. The air cleaning unit 38 includes an inlet 98, an air cleaning media 106 that may be multiple physical and chemical cleaning media for both particulate and gaseous pollution, and an outlet 102. The outlet 102 exhausts to a ducting system that extends substantially from the front 46 of the bus 10 to the rear of the bus 10 and is configured to deliver the cleaned air that has passed through the cleaning media to the passenger zone 86.

The above embodiments describe a system with an air cleaning unit 38 independent from an air conditioning unit 34. In one embodiment, the air cleaning unit 38 includes an independent air cleaner housing 94 and the air conditioning unit 34 includes an independent air conditioning housing 90. While the housings 90, 94 are independent, the air cleaning unit 38 and the air conditioning unit 34 may be controlled by a common controller, such that the atmosphere within the cabin 30 is controlled by a single controller.

In the case where a single controller controls both the air cleaning unit 38 and the air conditioning unit 34, the units 34, 38 may be controlled independent from one another or may be controlled by a common algorithm or program to interact with one another to maintain a desired atmosphere within the cabin 30. In other words, the air cleaning unit 38 and the air conditioning unit 34 may be physically independent but may include a shared control system.

In another embodiment, a shell (not shown) my be installed to cover the air conditioning unit 34 and the air cleaning unit 38 such that an onlooker would see only a single unit on the vehicle 10. The air conditioning housing 90 and the air cleaning housing 94 are still separate, but a single shell covers both housings 90, 94 to provide a desired appearance while maintaining the advantages of the separate housings 90, 94. In yet another embodiment, the air cleaning unit 38 and the air conditioning unit 34 could be mounted to the shell thereby eliminating the separate air cleaning housing 94 and the air conditioning housing 90 while maintaining the air cleaning unit 38 separate and independent from the air conditioning unit 34.

In one embodiment, the cleaned air is directed toward the passenger zone 86 such that substantially all the cleaned air passes into and through the passenger zone 86 before diffusing into the rest of the cabin 30.

The invention also provides an independent air conditioning unit 34 that includes an inlet 91, a conditioning zone 92 with a compressor, a condenser, and an evaporator, and an outlet 93. The air conditioning unit 34 is operable to affect the temperature of the air within the cabin 30. The air conditioning unit 34 may also perform other functions such as dehumidifying the cabin 30. In one embodiment, the air conditioner is in communication with the duct system 42 such that conditioned air is directed toward the first zone 82 such that substantially all the conditioned air passes into and through the first zone 82 before diffusing into the rest of the cabin 30.

Various features and advantages of the invention are set forth in the following claims.

What is claimed is:

1. A mass transit vehicle comprising:
a frame;
a cabin mounted to the frame, the cabin including a roof and a passenger zone defining a passenger zone length;
an air cleaning unit including an air cleaner housing mounted to the roof, an air cleaning device disposed within the housing, an inlet upstream of the air cleaning device, and an outlet downstream of the air cleaning device, the air cleaning unit operable to draw in air through the inlet, through the air cleaning device, and discharge a flow of cleaned air out of the outlet;
a duct system disposed within the cabin and extending substantially along the passenger zone length, the duct system in fluid communication with the outlet and operable to receive the flow of cleaned air from the outlet and direct the flow of cleaned air to the cabin substantially evenly along the passenger zone length; and
an air conditioning unit including an air conditioner housing separate from the air cleaner housing, an air conditioning device disposed within the air conditioning housing, an inlet upstream of the air conditioning device, and an outlet downstream of the air conditioning device, the air conditioning unit operable to draw in air through the inlet, through the air conditioning device, and discharge a flow of conditioned air out of the outlet, wherein the outlet of the air conditioning unit is in communication with the duct system to direct the flow of conditioned air to the cabin substantially evenly along the passenger zone length, and
further wherein the duct system includes a cleaned air duct extending substantially along the passenger zone length and a conditioned air duct extending substantially along the passenger zone length, the conditioned air duct configured to convey the conditioned air separate from the conveyance of the cleaned air through the cleaned air duct, and wherein the cleaned air duct is disposed within the conditioned air duct and configured to discharge the flow of cleaned air outside the conditioned air duct into the passenger zone.

2. The mass transit vehicle of claim 1, wherein the air cleaning device includes an advanced air cleaning media.

3. The mass transit vehicle of claim 1, wherein the duct system is configured to direct the flow of cleaned air directly to the passenger zone.

4. The mass transit vehicle of claim 1, wherein the air conditioning unit is mounted to the roof.

5. The mass transit vehicle of claim 1, wherein the air conditioning unit is operable independently of the air cleaning unit.

6. The mass transit vehicle of claim 1, wherein the flow of conditioned air and the flow of cleaned air are conveyed separately through the duct system and mixed outside of the duct system in the passenger zone.

7. The mass transit vehicle of claim 1, wherein the cabin includes a aisle and a window on opposite sides of a portion of the passenger zone, and wherein the conditioned air duct is configured to direct the flow of conditioned air toward the aisle and the window.

8. The mass transit vehicle of claim 1, wherein the passenger zone includes passenger seating and designated areas for wheelchairs to be stationed during movement of the mass transit vehicle.

9. The mass transit vehicle of claim 8,
wherein the duct system is configured to direct the flow of conditioned air from the air conditioning unit outside of the passenger zone.

10. The mass transit vehicle of claim 1, wherein the ducting system includes a vent visible from the interior of the cabin, the vent providing communication between the duct system and the interior of the cabin.

11. A mass transit vehicle comprising:
a frame;
a cabin mounted to the frame, the cabin including a roof, a passenger zone defining a passenger zone length, and an aisle and a window on opposite sides of a portion of the passenger zone;
an air cleaning unit including an air cleaner housing mounted to the roof, an air cleaning device including an advanced air cleaning media and disposed within the housing, an inlet upstream of the air cleaning device, and an outlet downstream of the air cleaning device, the air cleaning unit operable to draw in air through the inlet, through the air cleaning device, and discharge a flow of cleaned air out of the outlet;

an air conditioning unit operating independently from the air cleaning unit and including an air conditioner housing separate from the air cleaner housing and mounted to the roof, an air conditioning device disposed within the air conditioning housing, an inlet upstream of the air conditioning device, and an outlet downstream of the air conditioning device, the air conditioning unit operable to draw in air through the inlet, through the air conditioning device, and discharge a flow of conditioned air out of the outlet; and a duct system disposed within the cabin and including a cleaned air duct in fluid communication with the outlet of the air cleaning unit and a conditioned air duct in communication with the outlet of the air conditioning unit, the cleaned air duct extending substantially along the passenger zone length and the conditioned air duct extending substantially along the passenger zone length, the cleaned air duct disposed within the conditioned air duct and configured to direct the flow of cleaned air to the passenger zone substantially evenly along the passenger zone length and the conditioned air duct directs the flow of conditioned air toward the aisle and the window.

* * * * *